United States Patent [19]

Brothers et al.

[11] Patent Number: 4,607,974

[45] Date of Patent: Aug. 26, 1986

[54] WAND AND WAND EXTENSION

[75] Inventors: Michael V. Brothers; Bruce W. Schaeffer, both of Sturgis, Mich.

[73] Assignee: Cooper Industries, Inc., Houston, Tex.

[21] Appl. No.: 583,671

[22] Filed: Feb. 27, 1984

[51] Int. Cl.⁴ .................... F16D 1/00

[52] U.S. Cl. .................... 403/24; 403/341; 403/354; 403/364; 160/178 R; 81/177.2; 74/544; 74/527

[58] Field of Search .............. 403/341, 361, 364, 354, 403/383, 24; 74/544, 527, 546, 547; 160/176, 178 R, 177, 168; 81/177 A

[56] References Cited

U.S. PATENT DOCUMENTS

| | | | |
|---|---|---|---|
| 1,628,553 | 5/1927 | Owens | 81/177 A |
| 1,743,241 | 1/1930 | Schmidt | 74/547 X |
| 2,546,387 | 3/1951 | Coffing | 74/527 X |
| 2,823,404 | 2/1958 | Hyman | 403/354 X |
| 2,832,943 | 4/1958 | Cutler | 403/364 X |
| 3,103,126 | 9/1963 | Textrom | 74/544 X |
| 3,425,479 | 2/1969 | Lorentzen et al. | 160/176 R |
| 3,443,624 | 5/1969 | Toth | 160/176 X |
| 3,489,987 | 1/1970 | Niskin | 403/364 X |
| 4,141,402 | 2/1979 | Marotto | 160/176 R |
| 4,380,885 | 4/1983 | Komagata | 403/383 X |

*Primary Examiner*—Cornelius J. Husar
*Assistant Examiner*—T. G. Williams
*Attorney, Agent, or Firm*—Wigman & Cohen

[57] ABSTRACT

A wand for adjusting window blinds comprises at least two wand sections. The first wand section is an elongated rod having a hook at one end for attachment to a mechanism for adjusting a window blind. A connection means comprising four longitudinally extending lobes is arranged at the other end of the first wand section. A second wand section comprises also an elongated rod having four fingers at one end thereof designed such that the fingers interengage between the four lobes of the first wand section to releasably and non-pivotably interconnect the two wand sections. Small teeth located on the sides of the fingers engage in notches formed in the lobes to maintain the two wand sections in engagement. Additional wand sections, similar to the second wand section, can be added to the second wand section to further lengthen the blind adjusting wand.

7 Claims, 5 Drawing Figures

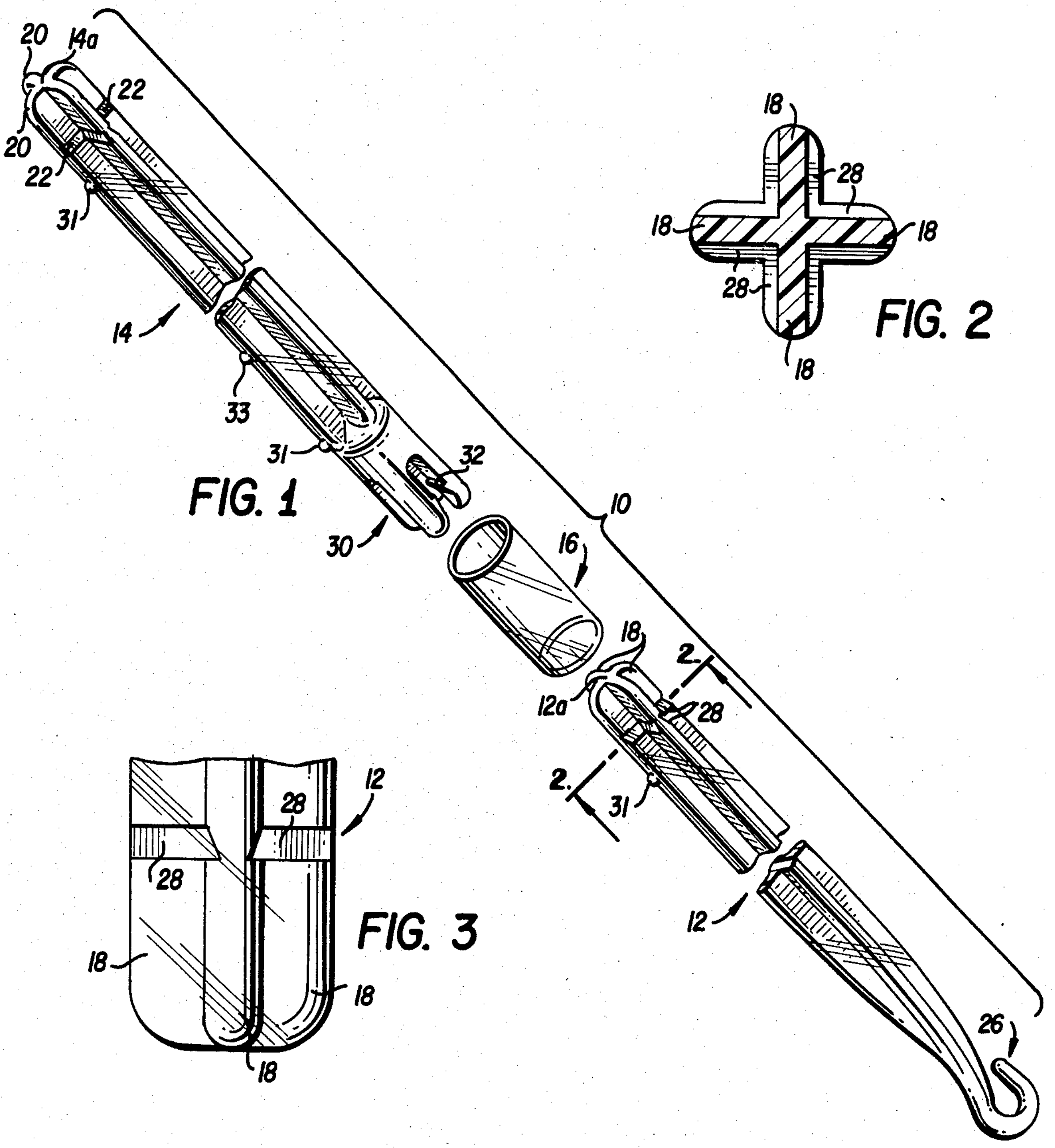
FIG. 1
FIG. 2
FIG. 3
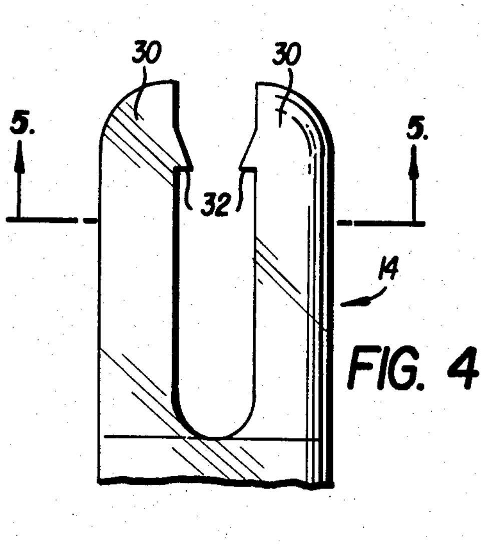
FIG. 4
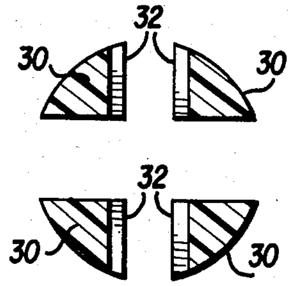
FIG. 5

WAND AND WAND EXTENSION

BACKGROUND OF THE INVENTION

The present invention relates to a wand for controlling the adjustment means of a window blind, and more particularly, to a wand having a novel means for attachment of a wand extension thereto.

Certain types of window blinds, particularly venetian blinds, are provided with a wand attached thereto which can be rotated to adjust the pitch of the individual blind slats. Heretofore, it has been a problem to supply the wands with the window blinds. Because the wands are relatively long and narrow, sometimes as long as five or six feet in length, it can be very difficult to store and ship them. Since the length of the wand is usually much longer than the width of the accompanying blind, the wands are frequently shipped in separate containers. Such separate containers result in additional packaging and shipping costs, are easily separated from the blinds, and are occasionally misplaced or lost.

Attempts have been made to provide wands comprising more than one section, but none of these have resulted in a wand that is readily assembled, and sufficiently sturdy and convenient enough for efficient and long-term use.

For example, U.S. Pat. No. 3,425,479 discloses a wand for adjusting blinds that is made from sections that are pivotally connected by rivets together to form one long wand. Such a riveted connection is not convenient or suitable for consumer assembly.

U.S. Pat. No. 3,921,695 discloses a wand-operated venetian blind wherein the wand is connected to a short shaft extending from a worm and gear arrangement used to adjust the blind. No provision is made for attaching a wand extension to form a longer wand.

These prior art devices are generally not satisfactory. The long one-piece wands are not practical for shipping or storage, and the connections used in connecting smaller wand sections into one long wand are neither convenient nor rigid enough to be satisfactory.

SUMMARY AND OBJECTS OF THE INVENTION

In view of the foregoing limitations and shortcomings of the prior art devices, as well as other disadvantages not specifically mentioned above, it should be apparent that there still exists a need in the art for an elongated wand for adjusting window blinds that can be conveniently assembled from two or more sections. It is, therefore, a primary object of this invention to fulfill that need by providing such a wand.

More particularly, it is an object of this invention to provide a wand comprising two or more sections that can be conveniently assembled by a rigid connection means.

It is another object of this invention to provide a window blind adjusting wand that comprises two or more sections that can be shipped and stored in separate pieces and subsequently assembled by the end user.

It is yet another object of this invention to provide a wand for adjusting venetian blinds comprising two or more sections wherein the connection means for joining the wand sections is easy to connect or disconnect without tools, yet provides a rigid and sturdy connection.

It is still another object of this invention to provide a wand for adjusting venetian blinds comprising two or more sections wherein wands of various lengths can be quickly assembled by connecting together a plurality of wand sections of a standardized length.

Briefly described, these and other objects are accomplished according to the invention by providing at least two wand sections. The first wand section comprises an elongated rod having a hook or other suitable connector at one end for attachment to a worm and gear mechanism used for adjusting a window blind. The hook or connector and the manner of attachment is conventional and may be similar to the arrangement shown, for example, in U.S. Pat. No. 3,425,479.

The wand section or body comprises four longitudinally extending lobes or ribs projecting from each other at right angles. The transverse cross-section of the wand section is in the form of a cross or X. A short distance from the opposite end of the wand, a series of notches is formed on opposite sides of each lobe.

A second wand section, also comprising an elongated rod, has four fingers formed at one end designed such that the fingers interfit between adjacent lobes or ribs of the first wand section and interconnect the two wand sections. Small teeth located on the sides of the fingers in the second section engage in the notches formed in the lobes to maintain the relative axial position of the two wand sections and lock the same together. A cylindrical collar is slidable over the interconnection to ensure that the teeth are retained in the notches, thus preventing the wand sections from being inadvertently separated. The other end and body of the second wand section is formed similarly to the first wand section, i.e., with four ribs at right angles. As such, additional wand sections, similar to the second wand section, may advantageously be attached to the second wand section.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is an exploded perspective view of the two wand sections and connecting collar;

FIG. 2 is a cross-section of the first wand section taken along line 2—2;

FIG. 3 is a detail view of the interconnecting end of one wand section;

FIG. 4 is a detail view of the interconnecting end (with fingers) of the wand extension section; and FIG. 5 is a cross-section of the wand extension section taken along line 5—5.

DETAILED DESCRIPTION OF A PREFERRED EMBODIMENT

Referring now in detail to the drawings wherein like parts are designated by like reference numerals throughout, there is illustrated in FIG. 1 a wand for adjusting window blinds designated generally by reference numeral 10. The wand 10 comprises a first wand section 12 and a second wand section 14 adapted to be connected together in a novel manner to be hereinafter described.

The first wand section 12 is shown in FIG. 1 with a hook 26 at one end for attachment to a conventional worm and gear mechanism (not shown) for adjusting the pitch of the slats of a window blind, such as a venetian blind. The construction of such worm and gear mechanism is well-known, for example, from the aforementioned U.S. Pat. Nos. 3,425,479 and 3,921,695, and is not, therefore, described in detail herein.

The body of the wand section 12 comprises four longitudinally extending radial lobes or ribs 18 arranged at right angles with respect to one another. Although in the preferred embodiment, as illustrated in FIG. 1, the radial lobes 18 extend over substantially the entire length of the wand section 12, it is only necessary that the lobes be formed adjacent the rounded end portion 12*a* of the wand section 12 opposite the hook 26. Transverse notches 28 are formed in each wall of the lobes at a location near the rounded end 12*a* of the wand section 12. The notches 28 are illustrated in detail in FIGS. 2 and 3. The wand section 12 can be made to any practical dimensions, although the preferred dimensions are a length of between two and three feet and a diameter of about three-eighths of an inch.

Wand section 12 is adapted to be extended by connecting thereto additional wand sections for use with blinds requiring a longer adjusting wand. FIG. 1 illustrates the second wand section or extension 14 which is designed to be readily and conveniently attached to the first wand section 12.

The second wand section 14 is provided with fingers or prongs 30 at one end. The fingers 30 are preferably of a quarter-round shape in cross-section as shown in FIG. 5, and are designed to interengage between adjacent lobes 18 of the first section 12. As best seen in FIGS. 4 and 5, each finger 30 has a small transverse tooth 32 arranged on one of the flat surfaces thereof. The teeth 32 are complementary to the notches 28 and are located such that they are aligned with and engage in the notches 28 of the first wand section 12 when the two sections 12 and 14 are interconnected.

That portion of the second wand section 14 extending from the fingers 30 is substantially identical to the corresponding portion of the first wand section 12 in that it also comprises four longitudinally extending radial lobes or ribs 20 projecting at right angles from one another. As in the first wand section, it is not necessary that the lobes 20 extend along the entire length of the wand section 14. Each side wall of the lobes 20 is provided with a small transverse notch 22 formed a short distance from the end of the wand section 14 opposite the fingers 30. The notches 22 are similar to the notches 28 of wand section 12. The rounded end 14*a* is likewise similar to end 12*a* of the first wand section 12 and is adapted to interengage with the end of a third wand section (not shown), if desired. A third wand section, if used, would be substantially identical in construction to the second wand section 14. Thus, as many wand sections as necessary could be interconnected to attain the desired wand length.

A cylindrical collar 16 is slidably arranged over the body of the second wand section 14 and is designed to slide over the interconnection area of the fingers 30 and lobes 18 after wand sections 12 and 14 have been connected. Collar 16 insures that the teeth 32 remain engaged in notches 28 to thereby prevent relative movement of the interconnected wand sections in the axial direction. Small protuberances 31 are located on both wand sections 12 and 14 adjacent the notches 22, 28 and prongs 30 to retain the collar 16 in its axial position over the interconnection area. Wand section 14 is provided with a further protuberance 33 for retaining the collar 16 adjcent the interconnection area when it is not in use. Each successive wand section would also be provided with a collar to immobilize the interconnection thereof to the next preceeding wand section.

Both wand sections 12 and 14 and the collar 16 are preferably made from polycarbonate, or other suitable lightweight, impact resistant plastic material.

When using the wand sections of the present invention it is not necessary to maintain a stock of window blind adjusting wands of different lengths. All that is needed is a supply of first and second wand sections, all of the same standard length. For short window blinds, the first wand section would suffice. For longer blinds, one or more second wand sections may be readily attached to the first wand section by the user to form a wand of the proper length. Because the wand sections are easy to connect, they may be shipped disassembled in containers that are much smaller than would be necessary for one long wand and preferably, in the same container with the window blind.

Although only preferred embodiments are specifically illustrated and described herein, it will be appreciated that many modifications and variations of the present invention are possible in light of the above teachings and within the purview of the appended claims without departing from the spirit and intended scope of the invention.

What we claim is:

1. A wand for adjusting window blinds, comprising:

a first wand section having means at one end for attachment to a window blind adjusting mechanism and a connection means at the other end; and a second wand section having a connection means at one end for releasably and non-pivotably interconnecting with the connection means of the first wand section and for transmitting clockwise and counterclockwise rotation to said first wand section along the longitudinal axis thereof;

one of said connection means comprising a plurality of radial ribs, the other of said connection means comprising a plurality of fingers interengaging between said radial ribs;

said plurality of radial ribs comprises four longitudinally extending ribs connected together and projecting radially at right angles from a longitudinally extending central axis and said plurality of fingers comprises four fingers arranged at right angles and interengageable between said ribs.

2. A wand according to claim 1, wherein the second wand section includes means at the other end thereof for releasably and non-pivotably interconnecting with additional wand sections.

3. A wand according to claim 1, wherein one of said plurality of ribs and plurality of fingers is provided with notches and the other of said plurality of ribs and plurality of fingers is provided with teeth for engaging in said notches.

4. A wand according to claim 1, further comprising a hollow cylindrical collar means slidable over both of said connection means when said connection means are interengaged for preventing disengagement of said connection means.

5. A wand according to claim 1, further comprising a further connection means at the other end of the second wand section, whereby a third wand section may be releasably and non-pivotably attached to the other end of the second wand section.

6. A wand according to claim 4, further comprising protuberances on said wand sections adjacent said connection means for retaining said collar over said connection means when said wand sections are interconnected.

7. A wand according to claim 1, wherein said wand sections are molded from a high impact plastic material.

* * * * *